US006559796B1

(12) United States Patent
Huber et al.

(10) Patent No.: US 6,559,796 B1
(45) Date of Patent: May 6, 2003

(54) METHOD AND DEVICE FOR EMITTING A TIME SIGNAL

(75) Inventors: Felix Huber, Gerlingen (DE); Ernst Messerschmid, Reutlingen (DE); Wolfgang Schäfer, Ditzingen (DE)

(73) Assignee: Steinbeis Transferzentrum Raumfahrtsysteme (DE)

( * ) Notice: Subject to any disclaimer, the term of this patent is extended or adjusted under 35 U.S.C. 154(b) by 0 days.

(21) Appl. No.: 09/509,373

(22) PCT Filed: Sep. 17, 1998

(86) PCT No.: PCT/EP98/05913

§ 371 (c)(1), (2), (4) Date: Jul. 17, 2000

(87) PCT Pub. No.: WO99/15940

PCT Pub. Date: Apr. 1, 1999

(30) Foreign Application Priority Data

Sep. 24, 1997 (DE) ........................................ 197 42 100

(51) Int. Cl.[7] ........................ H01Q 21/06; H01Q 21/24; H04B 7/10

(52) U.S. Cl. .......................... 342/365; 342/354; 368/14

(58) Field of Search ................................ 342/359, 363, 342/364, 365, 354; 368/14

(56) References Cited

U.S. PATENT DOCUMENTS

| | | | | |
|---|---|---|---|---|
| 3,646,589 A | * | 2/1972 | Poitevin | |
| 5,408,444 A | | 4/1995 | Kita et al. | |
| 5,574,660 A | | 11/1996 | Diekelman | |
| 5,920,284 A | * | 7/1999 | Victor | 342/357.01 |

FOREIGN PATENT DOCUMENTS

| | | |
|---|---|---|
| DE | 4313945 | 11/1994 |
| EP | 0444738 | 9/1991 |
| EP | 0498199 | 8/1992 |
| WO | 9527927 | 10/1995 |

* cited by examiner

*Primary Examiner*—Theodore M. Blum
(74) *Attorney, Agent, or Firm*—Ostrolenk, Faber, Gerb & Soffen, LLP

(57) ABSTRACT

A satellite provides a time signal that is adjusted for position of a receiver on the surface of the Earth. A receiver determines appropriate local time from the time signal, and can adjust a local clock accordingly, the satellite time signal in the form of a rotating beam containing angular information to determine the position of the satellite transmitter for proper synchronization. A fixed receiver can also measure the radiation angle of the transmitted beam.

54 Claims, 3 Drawing Sheets

METHOD AND DEVICE FOR EMITTING A TIME SIGNAL

This Application is based on and claims benefit of German Application No. 197 42 100.8 filed Sep. 24, 1997, to which a claim of priority is hereby made.

BACKGROUND OF THE INVENTION

1. Field of the Invention

The invention relates to a process for transmitting a time signal from a satellite as well as process for receiving a time signal at a ground based receiver.

2. Description of the Related Art

A terrestrial time signal transmitter for example the DCF-77 transmitter of the Federal Institute of Physical Engineering at Frankfurt um Main, transmits its time signal in the long wave frequency band in order to facilitate long range transmission. However, despite the high transmitting power, a range of only 1,200 to 2,000 kilometres results. In addition this time signal is designed only for one national time and furthermore uses a special transmitter frequency) and intrinsic encoding, so that in an area in foreign countries the receiver has to be suitable for several different time signals or else it is no longer capable of reading the signal. In an area at sea far removed from the coast, reception is in general no longer possible. Setting the time with the aid of satellite positioning systems (GPS) is certainly possible, however in this country they lack the supplementary information such as daylight saving time, leap second and so on, so that an involved semi-manual adjustment is necessary in order to maintain the actual local time.

So-called multiple radio clocks are also known, which make it possible to receive or exploit time signals in different countries. However, it is necessary in this connection for the clock to be adjusted by the user so that the time of the place in which it is located is known. These multiple radio clocks are, however, not able to function in all countries.

A process for determining a position of a receiver is known from U.S. Pat. No. 5,408,444. In order to be able to set the correct time in this receiver, its position has to be determined using at least three satellites of the GPS satellite system. If the position is established, the time adjustment is carried out using a correction value for this position, the said correction value being filed in a data bank of the receiver.

Likewise from U.S. Pat. No. 5,574,670, it is known how to fix the position, by means of the GPS system, of a receiver situated on the ground. In addition, provision is made in the receiver situated on the ground to redirect the antenna to the respective orbit.

From DF 43 13 945 A1, several satellites are combined together to form a satellite system. For the position determination of the receiver, which is to receive the time signal, merely the doppler curve over time is used. However, position determinations of this type are very imprecise.

The purpose of the invention is to specify a process for transmitting and receiving a time signal, in which process simply a transmitter for determining the position of the receiver has to be provided in order to be able to set the actual local time.

SUMMARY OF THE INVENTION

The process of the invention provides that, to achieve global reception of the time signal, the transmission occurs from an aerospace vehicle moving relative to a point on the earth's surface. The time signal is transmitted according to the invention with a particular frequency or several frequencies by the aerospace vehicle, which moves around an orbit with a high inclination. Further, provision is made that the signal rotates in the form of a beam at the transmitter in a predeterminable orbit and the rotating transmission beam contains angular information which is used to determine the direction of the transmitter. If the time signal transmits with one frequency, the distance between transmitter and receiver can be determined using the doppler curve. If several frequencies are used, the distance between transmitter and receiver can be determined by the propagation time scatter. In addition, because the angular information is acquired by the receiver from the rotating beam, the position of the receiver is determined in order to be capable of ascertaining whether the receiver is the left or right of a ground track of the aerospace vehicle. Consequently, an accurate position fixing of the receiver is possible, so that the actual local time can be set in the receiver. For determining the position of the receiver the radiated signal is therefore not radiated downwards uniformly, but rotates by means of a rotating beam. This rotation can be produced either by mechanically-driven antennas or by suitable electronic means. The rotating beam is altered in a suitable fashion as a function of the radiated angular position so that the instantaneous radiation angle can be determined from the received signal. This can be carried out for example by an auxiliary frequency, so that each angular position, or that is to say each range of angular positions between 0° and 360°, has a defined auxiliary frequency. An angle of 90° or 270° at the time of the greatest convergence then defines the side of the flyby.

A receiver independently determines its own geographic position on the earth from the received signals of the time signal transmitter and fixes the actual local time from that, without user intervention being necessary. A normal satellite cannot be considered for such a time signal because either the altitude is too high because of the required life and consequently the required incoming-signal levels are not obtained or the inclination of the orbit is too low, so that the entire surface of the earth cannot be radiated. With a low-flying satellite or space station (at an altitude of for example 200 km to 400 km) with a high orbit inclination, it is possible however to cover the earth's surface within the region of ±70 to 80 degrees of latitude. With a high orbit inclination, the entire earth's surface is overflown in the course of time by the satellite or space station.

By means of a special antenna geometry of the device according to the invention, the scanned area of the earth's surface can be expanded in width so that only the polar regions cannot be provided for Terrestrial radio clocks are normally synchronised only once a day, in order to save the battery. This normally takes place at night because the changeover between daylight saving time and winter time also occurs at that time. With a space-supported radio clock, this is not so readily feasible since the transmitter must stay in the reception area for the given time. That is why the time signal transmitter transmits other supplementary data on the time of the next overflight for a particular area in addition to the basic time information, so that the receiver already knows in advance the contact time of reception. On first switching-on the clock or on losing the contact times the receiver switches on again only briefly in order to ascertain whether the time signal can be received. A quiet period is then inserted which is shorter than one reception time window, so that a possible contact cannot be missed. As soon as the first reception contact has been established, the clock goes over to the normal switching-on cycle.

The reception area for a particular point on the ground of the transmitter can extend over several time zones. That is why the receiver must determine, how far the instantaneous point on the ground, for which the transmitted data was calculated, is removed from its own geographic position. Two alternatives are provided for this:

1. During an overflight by the satellite on space station relatively close to the receiver, the doppler shift in the received frequency caused by the high velocity of the transmitter is so large that the time of the overflight, and therefore the distance, can be determined from the sudden change in frequency and from the form of the frequency jump.

2. During a relatively far distant flyby of the transmitter, the propagation time scatter of different frequencies (and therefore the dependency of the wave motion velocity of propagation on the wavelength or frequency) while passing through the earth's ionosphere is exploited. The electrically-conducting upper atmospheric layers (ionosphere) impede the propagation radio waves depending on the frequency of the transmitted signal of varying strength. This causes the simultaneously radiated signals of various frequencies to arrive at the receiver at different times. If the electrical conductivity of the ionosphere is known, the distance of the transmitter from the receiver can be determined from this time shift. The current characteristics for the ionosphere can be determined by ground station, or the time signal transmitter itself continually measures the ionosphere, by analysing the echo of a test signal.

In a further advantageous design of the invention, the earth's surface is subdivided into numbered zones for saving in memory and computer requirements inside the receiver. The transmitter then transmits a number of the current zone and the previously mentioned supplementary information in addition to the time signal. These data are stored in the receiver. The transmitter therefore can also predict orbit corrections and time change-overs and communicate these to the receiver. By the division of the earth into suitable zones, which do not have to be identical to the international time/zones, the receiver is therefore capable of calculating the actual time in which the receiver is situated, by simple offset- addition or subtraction of the transmitted time information.

The transmitter transmits the actual times and the supplementary information continuously and in an iterative manner. So that the receiver does not have to wait the full period for an already started data packet before the transmission of a complete packet can be started, easily recognised synchronisation signals are embedded in the data stream, so that the analysis can be started in the middle of a packet as well. This minimises the time for which the receiver has to be activated and therefore decreases the electrical current consumption of the clock.

In accordance with international regulations, transmitters on satellites or space stations are not permitted to exceed a certain transmitter power (power flux density), so that other systems are not interfered with. In order to meet this boundary condition, the so-called spread spectrum technique is used in the process according to the invention, actually so that separate encoding and modulation can be carried out. The transmitter signal is then shifted periodically by a given frequency shift in the transmitter frequency (sweeping). This sweeping and all other changes in the transmitter signal occur synchronously and phase-locked to the time standards on board the time signal transmitter, so that the received time can be determined from the instantaneous sweep frequency and the sweep phase position with a resolution into the microseconds range.

For adjustment of the time on board the time signal transmitter, on the one hand control signals from a ground or control station are used, on the other hand the time signal transmitter itself can decode the time signals of national time transmitters during overflight in order to synchronise itself with them.

BRIEF DESCRIPTION OF THE DRAWINGS

The invention is now described in more detail using a design example, with reference to the drawings which show:.

DETAILED DESCRIPTION OF THE PREFERRED EMBODIMENTS

Figure 1:
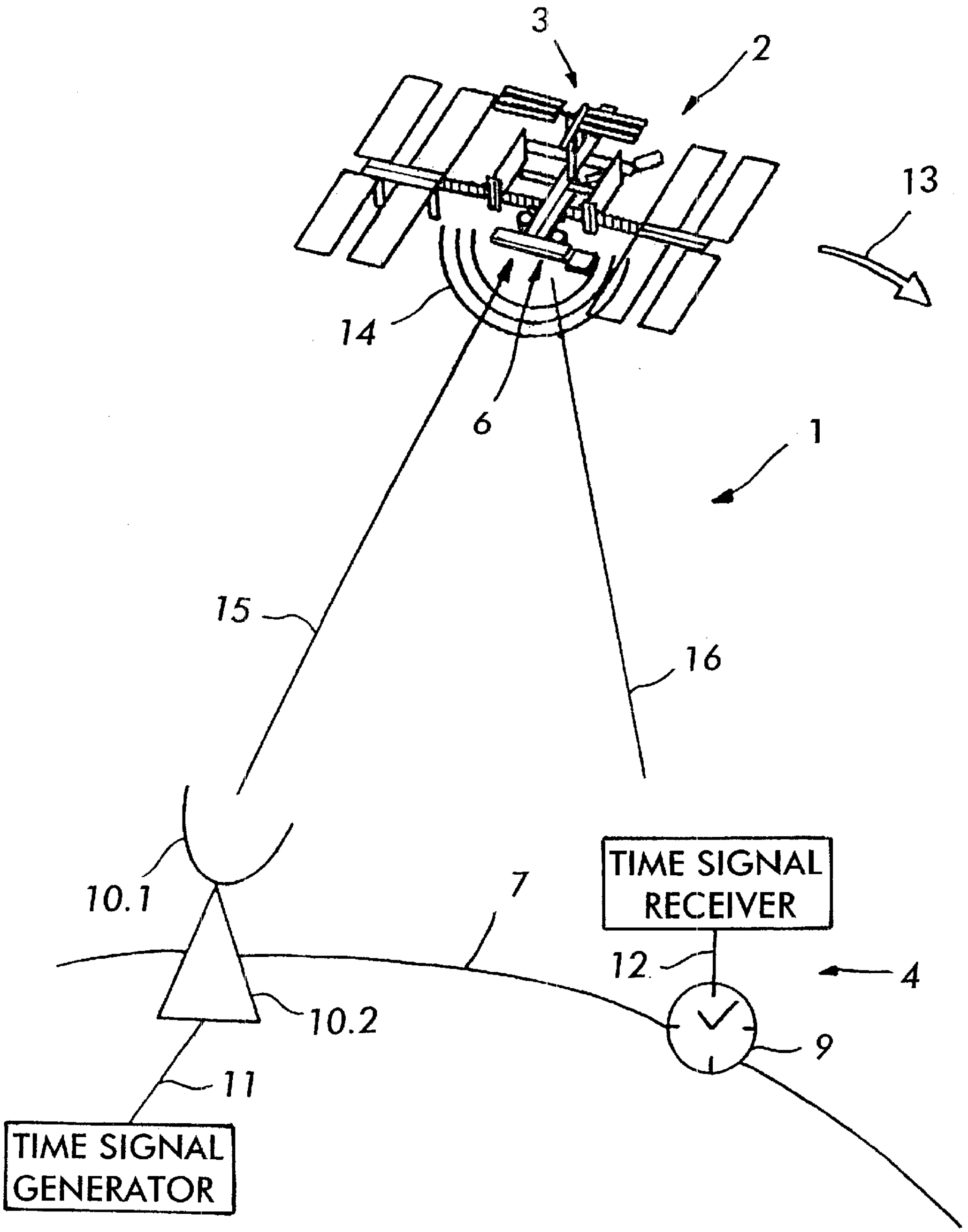
in FIG. 1 a diagrammatic illustration of a space-supported global time signal system, and in FIG. 2 a diagrammatic representation of the world, and in FIG. 3 a typical reception area on each, and in FIG. 4 a graph of a doppler shift.

FIG. 1 shows a space supported global time signal system 1, which is used for distributing an almost globally-received time signal 14 in order to produce an automatic adjustment of clocks to the prevailing local time in which the clock is situated. The time signal system 1 has an aerospace vehicle 2 in the form of a satellite 3, a receiver unit 4, a time signal generator 5 and a ground station 10.2 together with an antenna 10.1.

The satellite has a time signal transmitter 6 which serves to distribute or send out the time signal 14 as well as other supplementary information. The time signal 14 is indicated symbolically in the representation in FIG. 1 by a semicircular wave train and therefore no conclusion can be drawn on the actual propagation direction of the time signal 14 and the supplementary information. The device required for operation of the satellite 3, for example power supply, or flight control, are not provided with reference markings for reason of clarity.

The receiver unit 4, which is situated on the ground 7, has a time signal receiver 8 and a clock 9. The clock 9, which preferably also can be designated as a wristwatch, and the time signal receiver 8 are connected to each other by a connecting line so that synchronisation information can be transmitted from the time signal receiver 8 to the clock 9.

The time signal generator 5 is used to produce a time base by means of an atomic clerk for example, The time signal generator 5 is connected to the ground station 10.2, also described as a control station. The ground station together with its antenna 10.1 is used to transmit a signal, which is indicated by an arrow 15 in FIG. 1 and is used for synchronizing the on board time of the satellite 3.

The orbit of the satellite 3 is indicated in FIG. 1 by an arrow 13. An additional arrow 16 marks a signal flow direction of the time signal 14 from the time signal transmitter 6 to the time signal receiver 8.

Figure 2:
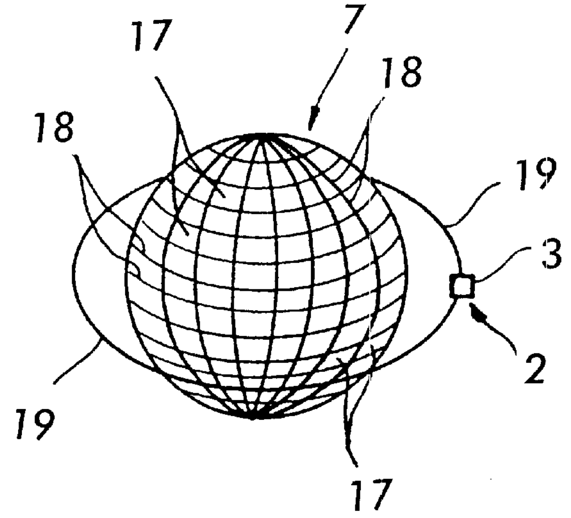

FIG. 2 shows in diagrammatic representation the earth 7 which is divided into several segments of zones 17. Two adjacent zones 17 are separated from one another by a zone border 18, which runs parallel to the meridans of longitude or to the parallels of latitude, so that the zones 17 are quasi quadratic or rectangular in shape. The zones 17 can be selected as far as possible so that they correspond roughly with the existing time zones on each 7; however this is only approximately possible, since there are few straight time zone boundaries in the world. In FIG. 2 the zones 17 are only drawn diagrammatically and therefore no conclusion can be drawn on its actual size in practice the size of the zone 17 can be dimensioned so that it is smaller than the reception area. The satellite 3 together with its orbit 19 is drawn only diagramatically to complete the picture. The correct flight path, or that is to say the correct orbit, 19 can be inferred from FIG. 3, which is described in more detail below.

Figure 3:
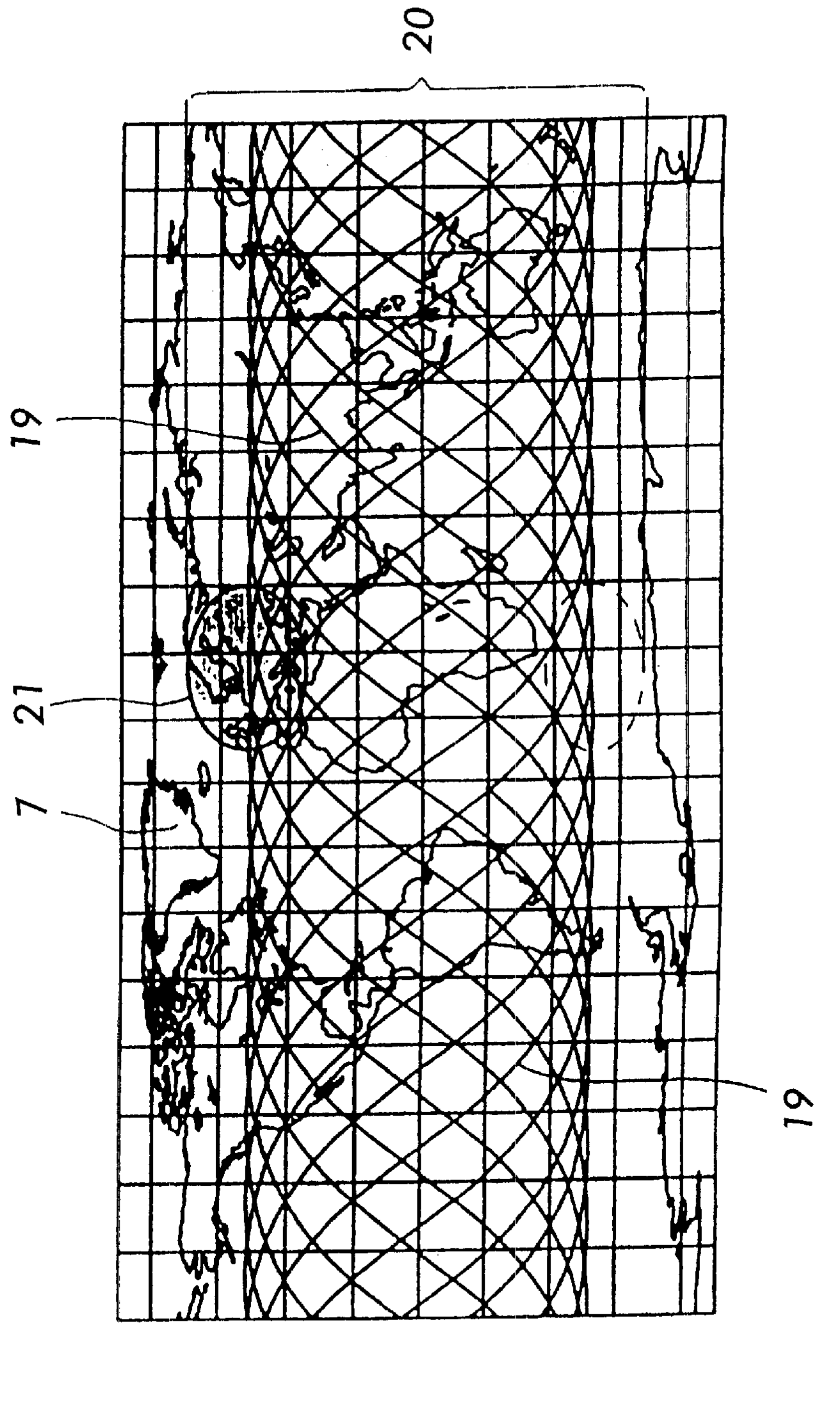

In a developed view of the earth, FIG. 3 shows the reception area 20 of the satellite 3 on the earth 7. A high inclination, or that is to say a large inclination of the orbit of the satellite 3 produces an orbit 19 which has a sinusoidal form. Several passes of the satellite 3 around the earth therefore results in extensive coverage of an almost global reception area 20. In FIG. 3 the reception area 20 of the satellite 3 is drawn so that a reception code 21 projected onto the earth 7 is instantaneously situated over Europe. In FIG. 3 it can be easily recognised that the reception cone 21 projected onto the earth 7, the said cone being formed by the development of the earth 7 elliptically in the illustration, includes the whole of Europe and thus sweeps over several real existing time zones.

Figure 4:
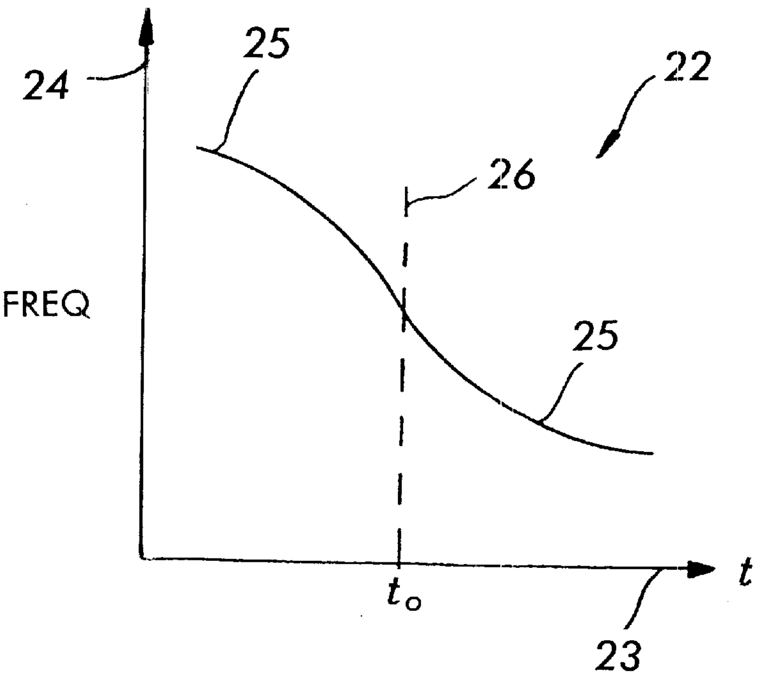

FIG. 4 shows a graph 22 with an exemplary frequency curve 25 of a doppler shift, as received from the viewpoint of the time signal receiver 8. Time is laid off on the abscissa 23 and frequency on the ordinate 24 on the graph 22 of FIG. 4. A dashed vertical line 26 marks an overfly time $t_0$ at which the time signal receiver 8 is at the minimum distance from the time signal transmitter 6. The area to the left of the dashed line 26 indicates the approach of the time signal transmitter 6 to the time signal receiver 8 and corresponds to the area to the right of the line 26, the area in which the time signal transmitter 6 is going away from the time signal receiver 8. The larger the velocity component of the time signal transmitter 6 towards the time signal receiver 8, the closer the satellite 3 is flying by the time signal receiver 8, and the more marked (i.e. the larger) the frequency shift within the bounds of the overfly time $t_0$. Consequently, the time signal receiver 8 can determine from the frequency response curve 25 the distance to the time signal transmitter 6 frequency.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A process for receiving a time signal, comprising:

a receiver determines independently its geographic position on the earth and from that the actual local time, whereby the receiver determines its geographic position from at least one of a time signal radiated with one or more frequencies by a transmitter, doppler shift and a distance to the transmitter from a propagation time scatter of the time signal, and the receiver determines a radiation angle from the time signal radiated as a rotating beam.

2. A process according to claim 1 characterised in that a doppler shift in the reception frequency is analysed to determine the position of the receiver.

3. A process according to claim 1, characterised in that a clock receives the time signal.

4. A process according to claim 3, characterised in that the clock is a wristwatch.

5. A process for transmitting a time signal an orbiting satellite to a receiving station on the surface of a orbited body, the process comprising the steps of:

placing a satellite in orbit with a large orbit inclination whereby a signal transmitted from the satellite toward the surface traces a path over a wide latitude as the satellite moves in its orbit;

transmitting an information signal toward the surface using at least one carrier frequency;

sweeping the angle at which the information signal is transmitted toward the surface back and forth relative to a center line; and modulating the information signal to encode therein, time information and information indicating the instantaneous transmission angle relative to the center line.

6. A process according to claim 5, wherein the time information represents an actual local time for a position overflown by the satellite.

7. A process according to claim 5, wherein the time information in the transmitted information signal changes dynamically as the position of the satellite changes relative to the surface of the orbited body.

8. A process according to claim 5, wherein the angle at which the information signal is transmitted relative to the center line is varied in discrete steps as a function of time.

9. A process according to claim 5, wherein the angle at which the information signal is transmitted relative to the center line is varied continuously as a function of time.

10. A process according to claim 5, wherein the information signal is transmitted from the satellite using sub-carrier frequencies.

11. A process according to claim 5 wherein the information signal is transmitted from the satellite using a plurality of separate antennas with phase control to vary the angle of transmission relative to the center line.

12. A process according to claim 5, wherein the signal is transmitted from the satellite using a single antenna which is mechanically swept to vary the angle of transmission relative to the center line.

13. A process according to claim 5, further including the steps of:

dividing the surface of the orbited body into a plurality of reception zones, each of which is assigned a number; and modulating the information signal transmitted by the satellite to include the assigned number for a reception zone over which the satellite is located at the time the signal is being transmitted.

14. A process according to claim 5, further including the step of modulating the information signal transmitted by the satellite to include information as to at least one of the ephemeris of the satellite, the flight direction of the satellite, the position of the satellite, and the time of a next overflight of the satellite relative to a position on the surface.

15. A process according to claim 5 further including the step of modulating the information signal transmitted by the satellite to include information representing the signal transmission characteristics of the ionosphere at a particular time.

16. A process according to claim 15 wherein the information representing the signal transmission characteristics of the ionosphere is obtained by the satellite from a ground station.

17. A process according to claim 15 wherein the information representing the signal transmission characteristics of the ionosphere is obtained by the satellite by analysis of an echo of a test signal transmitted by the satellite.

18. A process according to claim 5, wherein the information indicating the instantaneous transmission angle is in the form of frequency or phase modulation of the information signal.

19. A process according to claim 5, wherein the time information is modulated or encoded separately from the transmission angle information.

20. A process according to claim 5, further including the step of receiving a time adjustment signal for a clock on board the satellite during overflight above a national time transmitter on the surface of the orbited body.

21. A process for determining local time at a receiving station on the surface of a orbited from information transmitted by an orbiting satellite, the process comprising the steps of:

transmitting a time signal from the satellite as described in claim 5;

storing information at a receiving station identifying a plurality of reception zones on the surface of the orbited body;

receiving the signal transmitted from the satellite at the receiving station;

processing the received information to compute the geographic position of the receiving station relative to the satellite at the time signal is received; and mapping the computed geographic position to one of the reception zones.

22. A process according to claim 21, wherein:

each of the reception zones is assigned a number which is stored by the receiving station; and the signal transmitted by the satellite includes the assigned number for the reception zone over which the satellite is located at the time the signal is being transmitted.

23. A process according to claim 21, wherein:

the information signal is transmitted from the satellite using a plurality of carrier frequencies; and the receiving station determines the distance to the satellite according to differences in propagation time through the ionosphere of the respective carrier frequencies.

24. A process according to claim 23, further including the step of modulating the information signal transmitted by the satellite to include information representing the signal transmission characteristics of the ionosphere.

25. A process according to claim 24, wherein the information representing the signal transmission characteristics of the ionosphere is obtained by the satellite from a ground station.

26. A process according to claim 24, wherein the information representing the signal transmission characteristics of the ionosphere is obtained by the satellite by analysis of an echo of a test signal transmitted by the satellite.

27. A process according to claim 21, wherein:

the information signal is transmitted from the satellite using a single carrier frequency; and the receiving station computes its geographical position relative to the satellite by determining the distance from the satellite based on doppler shift of the carrier frequency.

28. A process according to claim 21, wherein the receiving station computes its angular displacement relative to the center line from the transmission angle information.

29. A process according to claim 21, wherein the time information transmitted by the satellite represents an actual local time for a position being overflown by the satellite at the time of transmission; and further including the step of determining the actual local time at the receiving station by correcting the time information received from the satellite to account for the difference in the geographic position of the receiving station relative to the position being overflown by the satellite.

30. A process according to claim 21, wherein:

the information signal is transmitted from the satellite using a plurality of carrier frequencies; and the receiving station computes is geographic position relative to the satellite by determining the distance from the satellite based on the propagation time scatter of the carrier frequencies through the ionosphere.

31. A process according to claim 5, wherein encoding and transmission of the time information is carried out synchronously.

32. A process according to claim 5, wherein a frequency of the information signal is synchronously shifted.

33. A process according to claim 32 wherein enhancement in temporal discrimination results from the shift in frequency.

34. A process according to claim 32, wherein the information signal further includes a frequency or phrase shift and further temporal resultion of the time information is produced from the frequency or phase shift relationship.

35. A process according to claim 5, wherein the information signal further includes transmitted data packets that contain synchronisation signals.

36. A process for deriving a time signal at a receiving station based on information transmitted from a transmission station that is in motion relative to the receiving station, the information being transmitted as a beam which is swept back and forth relative to a center line, and using one or more carrier frequencies, wherein the information transmitted includes time information and information as to the transmission angle of the beam relative to a center line, the process comprising the steps of:

performing a determination at a receiving station of the distance of the receiving station from the transmitter at a time of receptor of information therefrom using doppler shift in the case of a single carrier frequency, and using propagation time scatter in the case of multiple frequencies;

performing a determination at the receiving station of its angular position relative to the center line using the transmission angle information; and determining the time at the receiving station by adjusting the time indicated by the transmitted time information according to the determined distance and angular position of the receiving station relative to the transmitting station.

37. A process according to claim 36, further including the step of setting a clock according to the determined time.

38. A process according to claim 37, wherein the clock is a wristwatch.

39. A process according to claim 36, further including the step of activating the receiving station at a time indicated by information provided from transmitting station during an earlier transmission.

40. Apparatus for transmitting a time signal comprising:

an orbiting satellite, the satellite having a large orbit inclination whereby a signal transmitted from the satellite toward the surface of an orbited body traces a path over a wide latitude as the satellite moves in its orbit, the satellite including:

a transmitter using at least one carrier frequency for transmitting an information signal;

a scanning device that sweeps the angle at which the information signal is transmitted back and forth relative to a center line; and a modulation device that encodes on the information signal, time information and information indicating the instantaneous transmission angle relative to the center line.

41. Apparatus according to claim 40, wherein the time information transmitted is dynamically changed as the satellite moves in its orbit.

42. Apparatus according to claim 40, wherein the scanning device is operative to vary the transmission angle in discrete steps as a function of time.

43. Apparatus according to claim 40, wherein the scanning device is operative to vary the transmission angle continuously as a function of time.

44. Apparatus according to claim 40, wherein the transmitter includes a plurality of separate antennas, and the scanner includes a phase controller to vary the angle of the antenna relative to the center line.

45. Apparatus according to claim 40, wherein the transmitter includes a single antenna, and the scanner is operative to sweep the antenna mechanically to vary the transmission angle relative to the center line.

46. Apparatus according to claim 40, wherein at least one of the ephemeris of the satellite, the flight direction of the satellite, the position of the satellite, and the time of a next overflight of the satellite relative to a position on the surface is encoded on the information signal.

47. Apparatus according to claim 40, wherein information representing the signal transmission characteristics of the ionosphere at a particular time is encoded on the information signal.

48. Apparatus according to claim 42, further including:

a device for transmitting a test signal;

a device for receiving an echo of the test signal; and a device operative to analyze the echo of a test signal to determine the signal transmission characteristics of the ionosphere.

49. Apparatus according to claim 40, wherein the information signal is transmitted in the form of data packets that contain synchronisation signals.

50. Apparatus according to claim 40, further including a circuit operative receive a time adjustment signal for a clock on board the satellite during overflight above a national time transmitter.

51. A receiving station apparatus for deriving a time signal based on information transmitted from an orbiting satellite, the information being transmitted as a beam which is swept back and forth relative to a center line, and using one or more carrier frequencies, and includes time information and information as to the transmission angle of the beam relative to a center line, the apparatus comprising:

a data processing device, the data processing device being operative to:

calculate the distance of the receiving station from the transmitter at a time of reception of an information signal based on a characteristic of the received signal;

calculate the angular position of the receiving station relative to the center line using the transmission angle information encoded on the information signal; and determine the time at the receiving station by adjusting the time indicated by the transmitted time information according to the determined distance and angular position of the receiving station relative to the transmitting station.

52. Apparatus according to claim 51, further including a timer operative to activate the receiving station at a time indicated by information provided from the satellite during an earlier transmission.

53. Apparatus according to claim 51, wherein:

information representing the signal transmission characteristics of the ionosphere is encoded on the information signal;

the information signal is transmitted from the satellite using a plurality of carrier frequencies; and the data processing device is operative to determine the distance to the satellite according to differences in propagation time through the ionosphere of the respective carrier frequencies.

54. Apparatus according to claim 51, wherein:

the information signal is transmitted from the satellite using a single carrier frequency; and data processing device is operative to determine the distance to the satellite based on doppler shift of the carrier frequency.

* * * * *